(12) United States Patent
Lentz et al.

(10) Patent No.: US 9,440,748 B1
(45) Date of Patent: Sep. 13, 2016

(54) NOTIFICATION MANAGEMENT SYSTEMS AND METHODS OF NOTIFYING AN AIRCRAFT CREW MEMBER USING THE SAME

(71) Applicants: Robert L. Lentz, Severna Park, MD (US); Fraser R. Chisholm, Lantau Island (HK)

(72) Inventors: Robert L. Lentz, Severna Park, MD (US); Fraser R. Chisholm, Lantau Island (HK)

(73) Assignee: ROCKWELL COLLINS, INC.

( * ) Notice: Subject to any disclaimer, the term of this patent is extended or adjusted under 35 U.S.C. 154(b) by 39 days.

(21) Appl. No.: 14/529,362

(22) Filed: Oct. 31, 2014

(51) Int. Cl.
*B64D 45/00* (2006.01)
*G06F 17/30* (2006.01)

(52) U.S. Cl.
CPC ......... *B64D 45/00* (2013.01); *G06F 17/30595* (2013.01)

(58) Field of Classification Search
CPC ...... G08G 5/02; G08G 5/0013; G01C 23/00; G05D 1/00; B64D 45/00; G06F 17/30595
See application file for complete search history.

(56) References Cited

U.S. PATENT DOCUMENTS

| | | | |
|---|---|---|---|
| 7,949,335 B2 | 5/2011 | Stefani et al. | |
| 8,768,534 B2 | 7/2014 | Lentz | |
| 2010/0312420 A1* | 12/2010 | Sham et al. | 701/3 |
| 2012/0023304 A1* | 1/2012 | Chan | G06F 9/546 |
| | | | 711/170 |
| 2013/0124018 A1* | 5/2013 | Lentz | G05D 1/00 |
| | | | 701/3 |

* cited by examiner

*Primary Examiner* — Yuen Wong
(74) *Attorney, Agent, or Firm* — Edmonds & Nolte, PC (57) ABSTRACT

A method of notifying an aircraft crew member using a notification management system includes creating a rule based on at least one flight condition and transmitting the created rule to the aircraft. The at least one flight condition may include air travel data. The method also includes receiving aircraft data generated by one or more aircraft systems, comparing the received aircraft data with the rule, and issuing a notification to the aircraft crew member based on the comparison between the received aircraft data and the at least one condition in the rule. The notification may include at least one action to be performed in response to the notification.

7 Claims, 7 Drawing Sheets

NOTIFICATION MANAGEMENT SYSTEMS AND METHODS OF NOTIFYING AN AIRCRAFT CREW MEMBER USING THE SAME

BACKGROUND

Aircrafts continuously generate data based on conditions experienced by the aircraft. However, conventional eEnabled aircraft systems do not analyze this data in real time for potential actionable information. For example, data from one or more aircraft systems may be obtained on a regular basis, but the aircraft crew may not be notified in real time of an action that is to be taken on the obtained information. As a result, opportunities to act to improve aircraft operations are missed.

What is needed, then, are systems and methods for notifying an aircraft crew member of the potential actionable information and indicating an action to be performed.

SUMMARY

Example embodiments may be directed to a method of notifying an aircraft crew member using a notification management system. The method may include creating a rule based on at least one flight condition and transmitting the created rule to the aircraft. The at least one flight condition may include air travel data. The method may further include receiving aircraft data generated by one or more aircraft systems, comparing the received aircraft data with the rule, and issuing a notification to the aircraft crew member based on the comparison between the received aircraft data and the at least one condition in the rule. The notification may include at least one action to be performed by the aircraft crew member in response to the notification.

Example embodiments may be directed to a notification management system for notifying one or more aircraft crew members. The system may include a ground module configured to create a rule defining at least one flight condition and transmit the created rule to the aircraft. The at least one flight condition may include air travel data. The system may further include an air module configured to receive aircraft data generated by one or more aircraft systems, compare the received aircraft data with the rule, and issue a notification to the one or more aircraft crew members based on the comparison between the received aircraft data and the at least one condition in the rule. The notification may include at least one action to be performed by the one or more aircraft crew members in response to the notification.

Example embodiments may be directed to a computer-program product for notifying an aircraft crew member. The computer-program product may include a non-transitory computer-readable storage medium having instructions stored thereon. The instructions may be executed by one or more processors of a computer and may include instructions for configuring a notification management system to create a rule defining at least one flight condition and instructions for configuring the notification management system to transmit the created rule to the aircraft. The at least one flight condition may include air travel data. The instructions may further include instructions for configuring the notification management system to receive aircraft data generated by one or more aircraft systems, instructions for configuring the notification management system to compare the received aircraft data with the rule, and instructions for configuring the notification management system to issue a notification to the aircraft crew member based on the comparison between the received aircraft data and the at least one condition in the rule. The notification may include at least one action to be performed by the aircraft crew member in response to the notification.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION OF EXEMPLARY EMBODIMENTS

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

In one or more exemplary embodiments disclosed below, various objects or components may be implemented as systems or modules. These systems or modules may be general-purpose, or they may have dedicated functions such as memory management, program flow, instruction processing, object storage, etc. The systems or modules may be implemented in a hardware circuit including custom VLSI circuits or gate arrays, off-the-shelf semiconductors such as logic chips, transistors, or other discrete components. One or more of the systems or modules may also be implemented in programmable hardware devices such as field programmable gate arrays, programmable array logic, programmable logic devices or the like.

In an exemplary embodiment, one or more of the systems or modules may be implemented in software for execution by various types of processors. An identified system or module of executable code may, for instance, include one or more physical or logical blocks of computer instructions that may, for instance, be organized as an object, procedure, or function. Further, the executables of an identified system or module may not be physically located together, but may include disparate instructions stored in different locations that, when joined logically together, include the module and/or system, and achieve the stated purpose for the system and/or module. The executable code may be a single instruction, or many instructions, and may be distributed over several different code segments, among different programs, and across several memory devices. Similarly, operational data may be identified and illustrated in association with one or more systems or modules, and may be embodied in any suitable form and organized within any suitable type of data structure. The operational data may be collected as a single data set, or may be distributed over different locations including over different storage devices, and may exist, at least partially, as electronic signals on a system or network.

Figure 1:
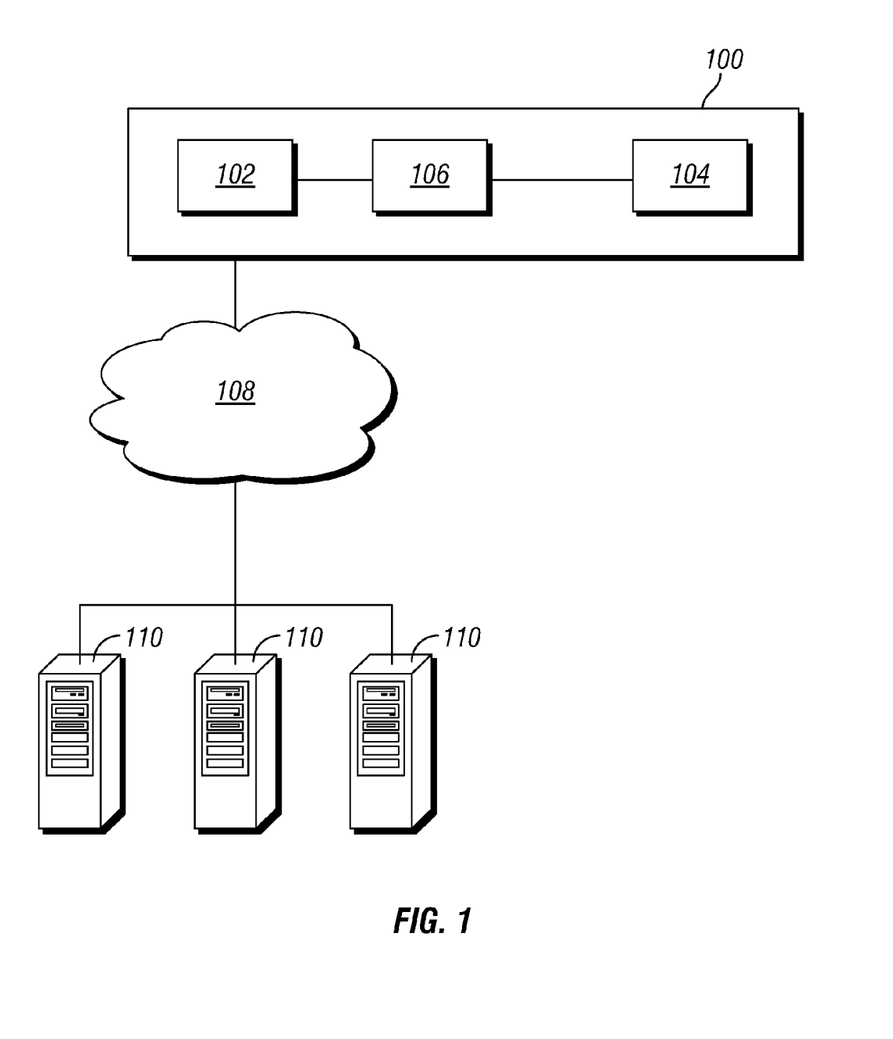
FIG. 1 illustrates a block diagram of a notification management system, according to exemplary embodiments.

FIG. 1 illustrates a block diagram of a notification management system 100, according to exemplary embodiments. The notification management system 100 may include a ground module 102 and an air module 104. The ground module 102 may be a ground based tool that may allow a user to create, edit, delete, and/or test rules that may be used by the air module 104 located on board the aircraft. The notification management system 100 may further include a delivery module 106 (also referred to as a Content Delivery Management System (CDMS)). The delivery module 106 may also be a ground based tool and may be used to deploy or transmit the rules from the ground module 102 to the air module 104. In an exemplary embodiment, the delivery module 106 may be absent and the rules may be deployed directly from the ground module 102 to the air module 104. The ground module 102, the air module 104, and the delivery module 106 (when present) may communicate directly with each other or via a network 108 (see below). The communication may either be wired or wireless.

The ground module 102 may be connected to a network 108 which may be accessed by a user via a user device 110. The network 108 may include the Internet; however, the network 108 may be an intranet or combination of any other network known in the art. The user device 110 may include, without limitation, a desktop computer, a mobile computing device, or another type of remote terminal or access point. In an exemplary embodiment, the user device 110 may include a CPU and memory (not shown), and may also include an operating system (OS) that controls the operation of the user device 110. The OS may be a MICROSOFT WINDOWS OS, but in other embodiments, the OS may be any kind of operating system, including without limitation any version of the LINUX OS, any version of the UNIX OS, or any other OS as is known in the art.

In an exemplary embodiment, a user may provide the user device 110 with input using any peripheral device configured to receive input and provide it to the OS, including without limitation, a keyboard, mouse, or touch screen display. In turn, the user device 110 may provide the user with output using any peripheral adapted to provide output from the OS to the user, including without limitation, a printer or a display (e.g., monitor). In at least one embodiment, the display may provide the user with at least one graphical user interface (GUI), enabling the user to interactively communicate with the ground module 102, as will be described in more detail below.

Figure 2:
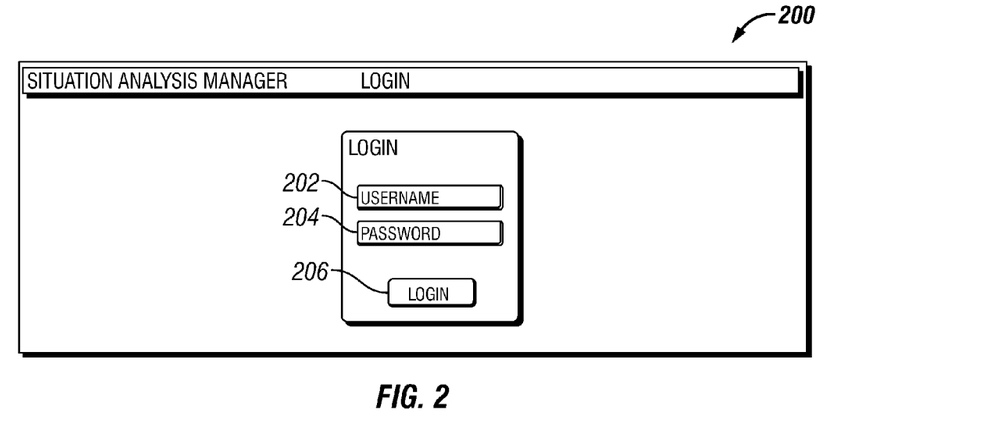
FIG. 2 illustrates a graphical user interface (GUI) for accessing the ground module, according to exemplary embodiments.
Figure 3:
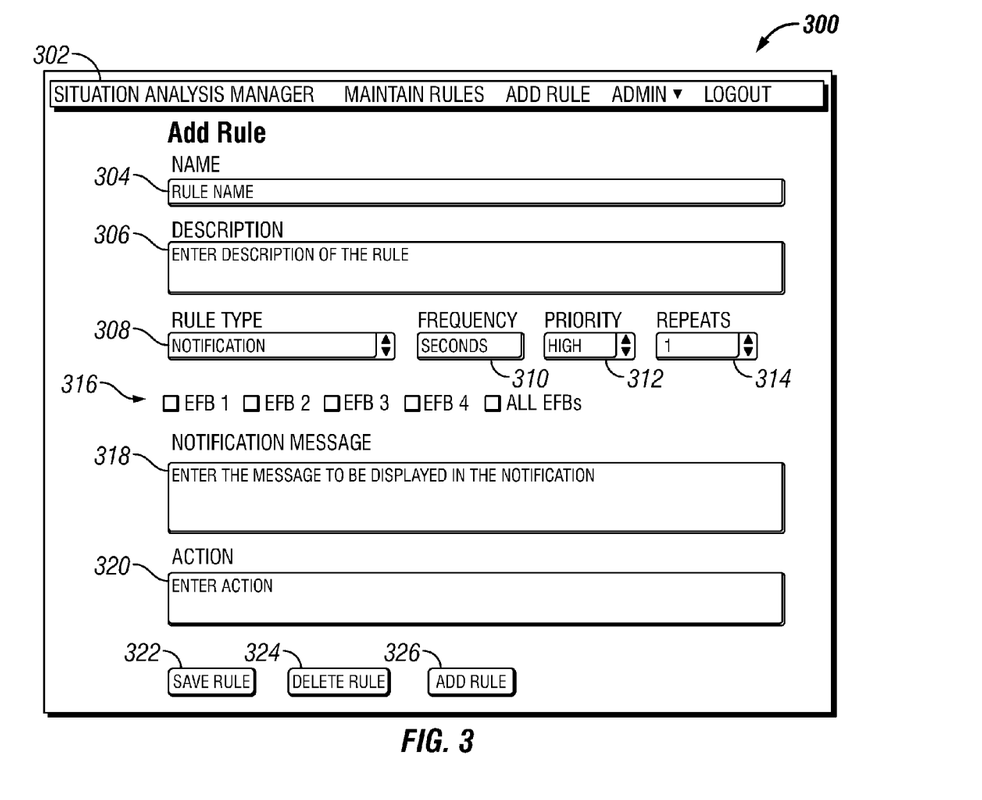
FIG. 3 illustrates a graphical user interface (GUI) for creating a rule, according to exemplary embodiments.

FIG. 2 illustrates a graphical user interface (GUI) 200 provided by the ground module 102, wherein a user may input a username 202 and password 204 for accessing the ground module 102, according to exemplary embodiments. After providing the username 202 and password 204, the user may select (for example, by clicking with a mouse or by touching the display) the login button 206 for authentication. FIG. 3 illustrates a graphical user interface (GUI) 300 for creating a rule, according to exemplary embodiments. The GUI 300 may be displayed on the user device 110 after the user has been authenticated based on the username 202 and password 204.

The GUI 300 includes a menu bar 302 and input fields Name 304, Description 306, Frequency 310, Notification Message 318, and Action 320. The GUI 300 may also display a List 316 of Electronic Flight Bags (EFBs) for which the rules are intended, drop down menus Rule Type 308, Priority 312, and Repeats 314, and buttons Save Rule 322, Delete Rule 324, and Add Rule 326.

The Name field 304 provides a place for the user to input the name of the rule. The Name field 304 may accept letters and numbers. The Description field 306 may permit the user to provide a brief description of the rule. The Description field 306 may also accept letters and numbers. The menu Rule Type 308 may be a drop down menu which when selected (for example, by clicking with a mouse or by touching the display), may permit the user to indicate the rule being created as one of two types, "Notification" and "Start of Flight" (not shown). The "Notification" type of rule may result in a notification being sent to a desired EFB (selected from the list 316 of EFBs) and a "Start of Flight" type of rule may signal the air module 104 to reset all counters and prepare for a new flight. A rule of the "Start of Flight" type may not send a notification. It will be understood that using EFBs to describe the embodiments disclosed herein is merely an example, and that any type of electronic information management device that may be used by an aircraft crew member to perform flight management tasks is also within the scope of this disclosure.

The Frequency field 310 may indicate how often the air module 104 may connect to one or more databases on board the aircraft and request new data from the one or more databases. The value indicated in the Frequency field 310 may be in seconds and may include positive numerals greater or equal to 1. In an exemplary embodiment, the one or more databases may be referred to as an Aircraft Data Management Service (ADMS). The one or more databases may receive aircraft data from one or more aircraft systems including, for example, the various applications running on the aircraft, the aircraft avionics, and the like. The aircraft data may also be obtained due to an action (e.g., yoke deflection and rudder pedal deflection, opening/closing of cabin door) by the aircraft crew members (e.g., pilot, co-pilot, or passenger cabin crew), aircraft position (e.g., GPS co-ordinates), atmospheric pressure and temperature, wind speed, aircraft ground speed, altitude, heading, bearing, and the like.

The menu Priority 312 may allow the user to set the priority of the notification that may be issued. The priority that may be set may match the priority of one or more applications running on the selected EFB(s). For example, if an application of priority 1 is currently being used by the EFB user, the user may not receive any notification(s) of priority 2 (or lower) as long as the EFB user is using the priority 1 application.

The Repeats menu 314 may permit the user to indicate a value that may indicate the maximum number of times a notification may be sent per rule, per flight. It should be noted that, when the air module 104 encounters a "Start of Flight" rule, the number of repeats will be reset.

The user may indicate the message part of the notification in the Notification Message field 318. This field may accept letters and numbers. The Action field 320 may indicate the action that the notification may require the receiving user, for example, one or more aircraft crew members, to undertake in response to the notification. The field may accept letters and numbers.

The user may save the created rule by selecting the Save Rule button 322 or may delete the rule being created by selecting the Delete Rule button 324. The user may create a new rule by selecting the Add Rule button 326.

When the user selects the Save Rule button 322, the information entered by the user may be validated. For example, if instead of numbers, the user inputs letters in the frequency field 310, the frequency field 310 may be highlighted and the user may be prompted to make the corrections. Also, if the user does not select an EFB from the list 316, the EFB list 316 may be highlighted. The created rule may not be saved until the user has carried out appropriate correction.

Figure 4A:
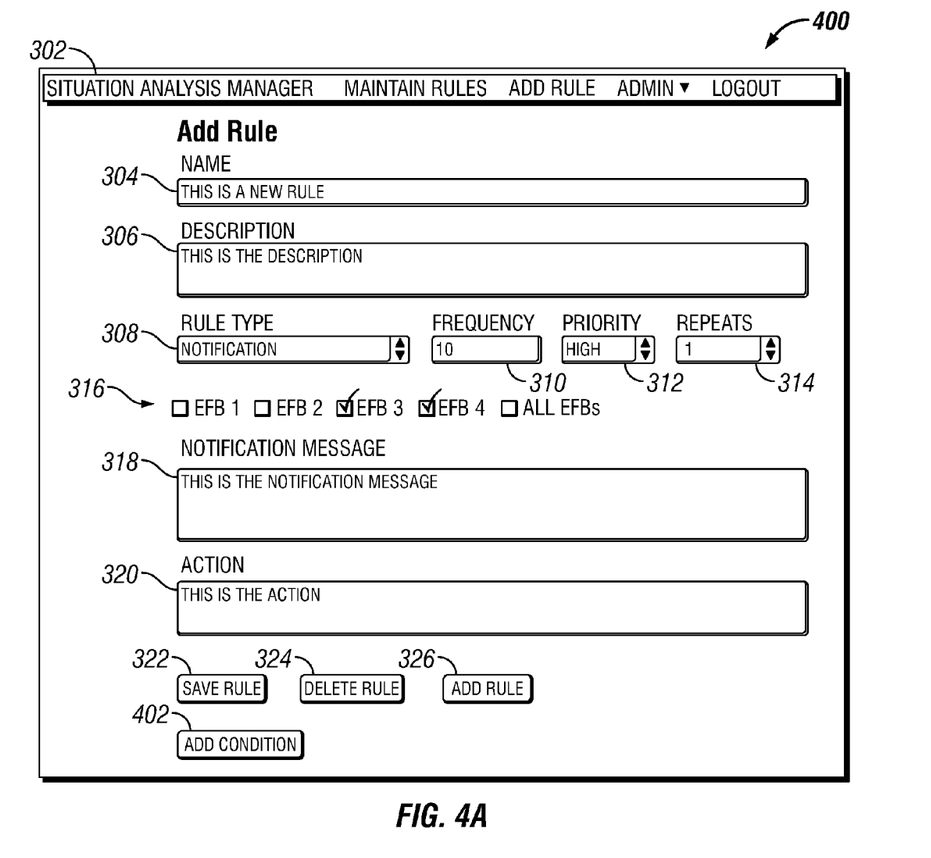
FIG. 4A illustrates a graphical user interface (GUI) that is displayed after a rule has been successfully saved using the GUI of FIG. 3, according to exemplary embodiments.

FIG. 4A illustrates a graphical user interface (GUI) 400 that is displayed after a created rule has been successfully saved using the GUI 300, according to exemplary embodiments. As illustrated in FIG. 4A, the user has selected EFBs, EFB3 and EFB4, indicated a frequency of "10 seconds," a priority of "High," and the number of times the rule may repeat as "1." After a rule has been successfully saved, the ground module 102 may display an "Add Condition" button 402 on the GUI 400. According to exemplary embodiments, the "Add Condition" button 402 may permit a user to define one or more flight conditions. For example, a flight condition may include air travel data such as the flight number, the flight destination, the aircraft registration number, data from the aircraft cabin door sensors indicating whether the aircraft's cabin doors are closed or are open, data from the weight-on-wheels sensor indicating whether the aircraft's wheels are down or that the aircraft's wheels are up, data generated due to actions by the aircraft crew members (e.g., pilot, co-pilot, cabin crew, ground crew), data indicating the aircraft's position, such as latitude and longitude, altitude, wind speed, or the atmospheric pressure and temperature. As will be understood, a flight condition may include data related to any stage of air travel, for example, passenger pickup/drop off, cargo pickup/drop off, landing, takeoff, cruise, taxi, or park. A user may thus be able to create rules that define a variety of flight conditions.

Figure 4B:
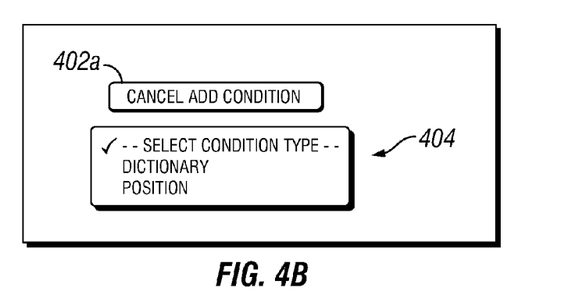
FIG. 4B illustrates a "Select Condition Type" drop down list that is displayed by the GUI of FIG. 4A when the user selects the "Add Condition" button, according to exemplary embodiments.

FIG. 4B illustrates a drop down list 404 that may be displayed on the GUI 400 when the user selects the "Add Condition" button 402 in FIG. 4A, according to exemplary embodiments. When the user selects the "Add Condition" button 402, a "Select Condition Type" drop down list 404 may be displayed, and the "Add Condition" button 402 may change to "Cancel Add Condition" button 402a. If the user selects the "Cancel Add Condition" button 402a, the "Cancel Add Condition" button 402a may revert back to the "Add Condition" button 402. The "Select Condition Type" drop down list 404 may display one or more condition types (two condition types, "Dictionary" and "Position," are shown in FIG. 4B).

Figure 4C:
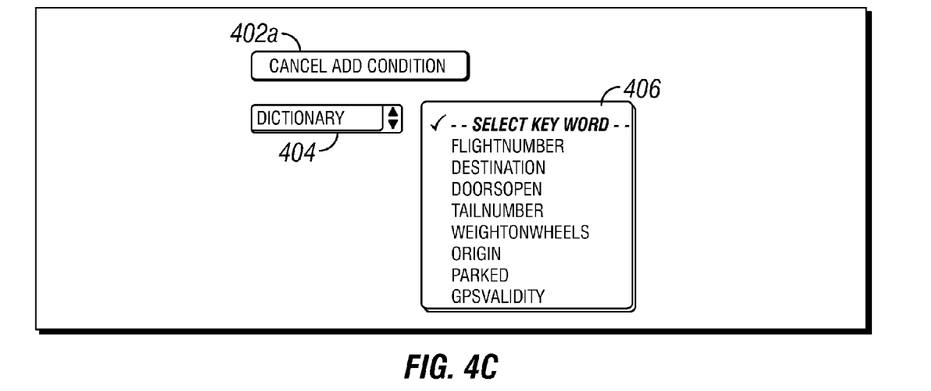
FIG. 4C illustrates a "Select Key Word" drop down list displayed by the GUI of FIG. 4A when the user selects a condition type from the "Select Condition Type" drop down list of FIG. 4B, according to exemplary embodiments.

When the user selects "Dictionary" in the "Select Condition Type" drop down list 404, a "Select Key Word" drop down list 406 may be displayed by the GUI 400, as illustrated in the exemplary embodiment in FIG. 4C. The "Select Key Word" drop down list 406 may include one or more key words. The key words may be programmed by a user of the type "ADMIN" (see below) and may be specific to an aircraft. The "Select Key Word" drop down list 406 is customizable and a user of the type "ADMIN" (see below) may be authorized to add, delete, and/or edit key words.

Figure 4D:
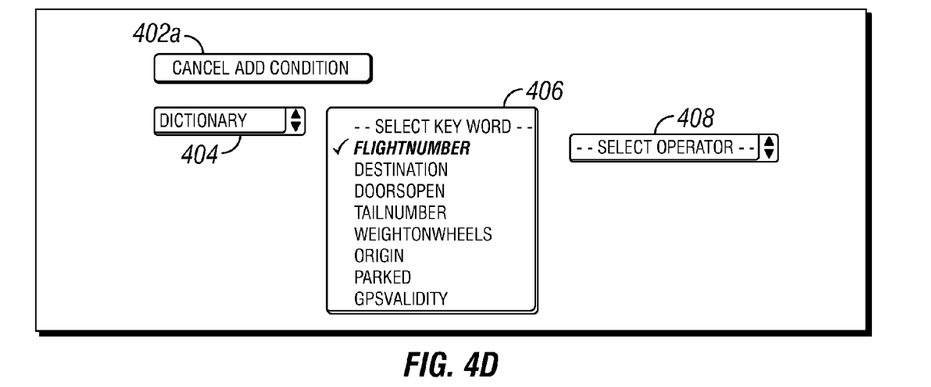
FIG. 4D illustrates a "Select Operator" drop down list displayed by the GUI of FIG. 4A when the user selects a key word from the "Select Key Word" drop down list of FIG. 4C, according to exemplary embodiments.
Figure 4E:
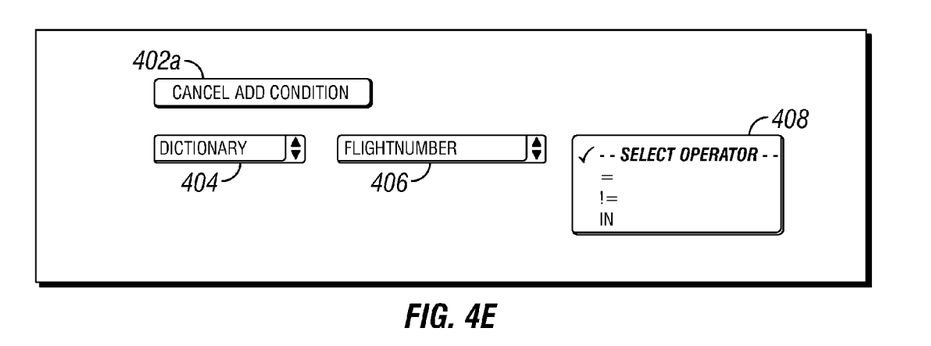
FIG. 4E illustrates operator values displayed in the "Select Operator" drop down list of FIG. 4D, according to exemplary embodiments.

When the user selects a key word from the "Select Key Word" drop down list 406, a "Select Operator" drop down list 408 may be displayed by the GUI 400, as illustrated in the exemplary embodiment of FIG. 4D. As illustrated in FIG. 4D, the user has selected the key word "FlightNumber"

from the "Select Key Word" drop down list 406. The "Select Operator" drop down list 408 may display one or more operators based on the selected key word. As illustrated in the exemplary embodiment of FIG. 4E, the operators "=," "!=," and "IN" may be displayed in the "Select Operator" drop down list 408. Although only 3 operators are illustrated, it should be noted that any desired number of operators, such as logical operators (e.g., AND, OR, NOT) and comparison operators (e.g., Equal to, Not equal to, Less than, Less than or equal to, Greater than, Greater than or equal to, BETWEEN, LIKE) may be displayed. It should be noted that the operators displayed may be the same or different for different key words. The operators to be displayed for a selected key word are user-configurable and may be configured by a user of the type "ADMIN."

Figure 4F:
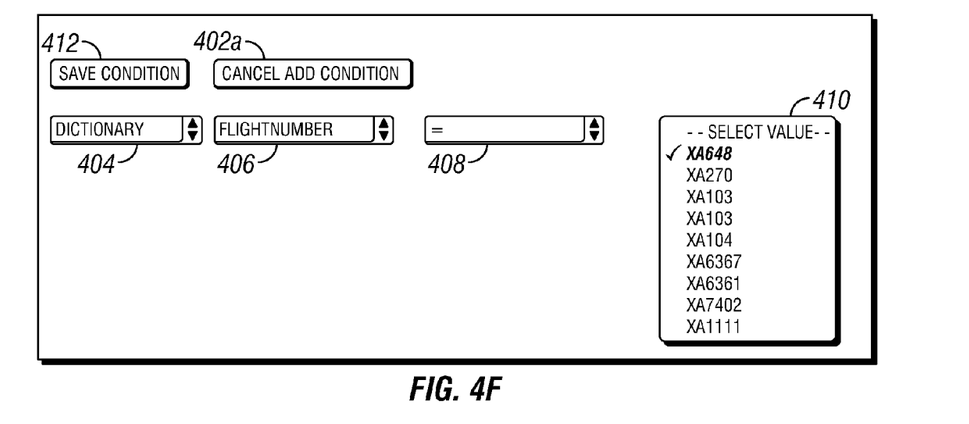
FIG. 4F illustrates a "Select Value" drop down list displayed by the GUI of FIG. 4A when the user selects an operator from the "Select Operator" drop down list of FIG. 4E, according to exemplary embodiments.

When the user selects an operator from the "Select Operator" drop down list 408, a "Select Value" drop down list 410 may be displayed by the GUI 400, as illustrated in the exemplary embodiment of FIG. 4F. As illustrated in FIG. 4F, the user has selected the "=" operator from the "Select "Operator" drop down list 408. In the "Select Value" drop down list 410, the user can select a desired value. As the operators from the "Select Operator" drop down list 408, the values to be displayed in the "Select Value" drop down list 410 may also be user-configurable. Depending of the selected operator, the user may be permitted to select one or more values in the "Select Value" drop down list 410. For instance, the user has selected the operator "=" from the "Select Operator" drop down list 408 and thus may be able to select only one value from the "Select Value" drop down list 410. If the user were to select the operator "IN" from the "Select Operator" drop down list 408, the user may be able to select multiple values from the "Select Value" drop down list 410.

Figure 4G:
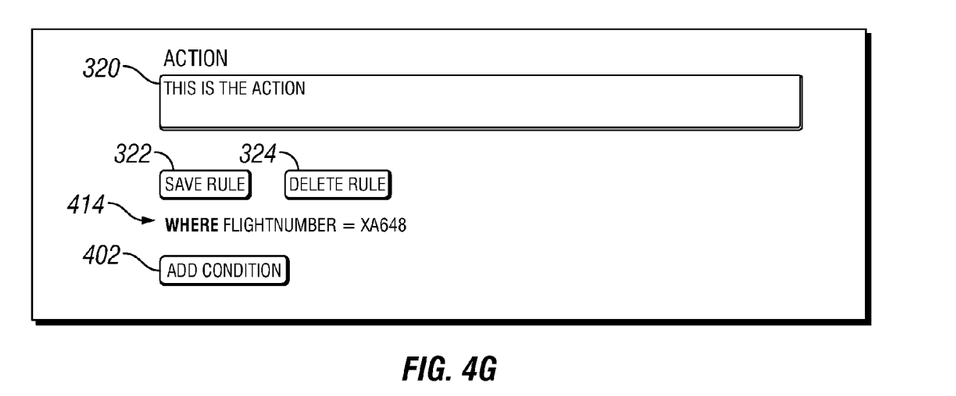
FIG. 4G illustrates a portion of the GUI of FIG. 4A displaying a newly created condition, according to exemplary embodiments.

After the one or more values have been selected from the "Select Value" drop down list 410, a "Save Condition" button 412 may be displayed. When the user selects the "Save Condition" button 412, the newly created condition may be saved and displayed in an area 414 of the GUI 400. FIG. 4G illustrates a portion of the GUI 400 displaying the newly created condition, according to exemplary embodiments. It should be noted that the location of the area 414 is merely an example, and the newly created condition may be displayed in any user desired portion of the GUI 400.

According to exemplary embodiments, the ground module 102 may also be configured to create rule(s) having multiple conditions. For example, for creating a two condition rule, after the first condition has been saved (as disclosed above), the user may again select the "Add Condition" button 402 to define a second condition using the process described above. When the second condition has been saved, the ground module 102 may prompt (e.g., via a popup window, not illustrated) the user to select a clause type, such as "AND" or "OR," to link the two conditions together, thereby creating a rule with two conditions. For example, a rule with two conditions may be indicated as —WHERE FlightNumber=XA648 AND Destination=KAKR. For creating rules with more than two conditions, the above-described process may be repeated.

Figure 4H:
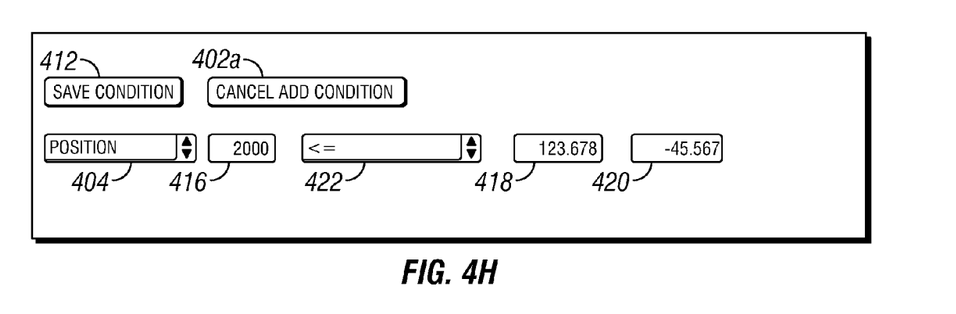
FIG. 4H illustrates a portion of the GUI of FIG. 4A that is displayed when the user selects a different condition type from the "Select Condition Type" drop down list of FIG. 4B, according to exemplary embodiments.

FIG. 4H illustrates a portion of the GUI 400 displayed when the user selects a condition type "Position" from the "Select Condition Type" drop down list 404 of FIG. 4B instead of the condition type "Dictionary," according to exemplary embodiments. When the condition type "Position" is selected, instead of "Dictionary" (See FIG. 4B), inputs fields 416, 418, and 420, and an "Operator" drop down list 422 may be displayed on the GUI 400. In the field 416, the user may input the distance in nautical miles. The position information such as Latitude and Longitude may be input in the fields 418 and 420, respectively. The "Operator" drop down list 422 may include one or more logical and/or comparison operators. For example, in FIG. 4H, the user has selected the operator "<=." As a result, the "Position" condition in FIG. 4H may result in a notification when a location defined by Longitude: 123.578 and Latitude: −45.567 is less than or equal to 2000 nautical miles from the current position of the aircraft. The current position of the aircraft may be generated by one or more aircraft systems on board the aircraft and the air module 104 may request the current position based on the frequency specified in the rule.

In an exemplary embodiment, the ground module 102 may define two user types, "USER" and "ADMIN." Individuals of the type "USER" may be only authorized to add, delete, edit, and/or view rules, while individuals of the type "ADMIN," may be authorized to Manage User Groups, Manage Users, Configure the notification management system, Add Rules, Delete Rules, Edit Rules, View Rules, Approve Rules, Deploy Rules, Review Deployment History, Add Dictionary Value(s), and/or Delete Dictionary Value(s), in addition to adding, deleting, editing, and/or viewing rules.

Figure 4I:
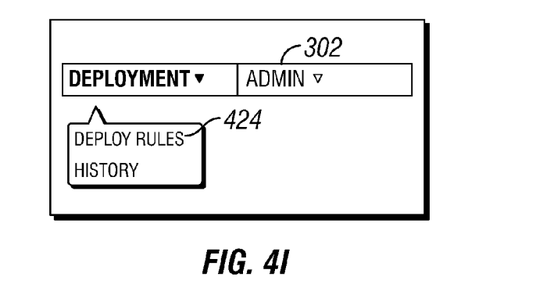
FIG. 4I illustrates a "Deployment" menu displayed by the GUI of FIG. 4A, according to exemplary embodiments.
Figure 4J:
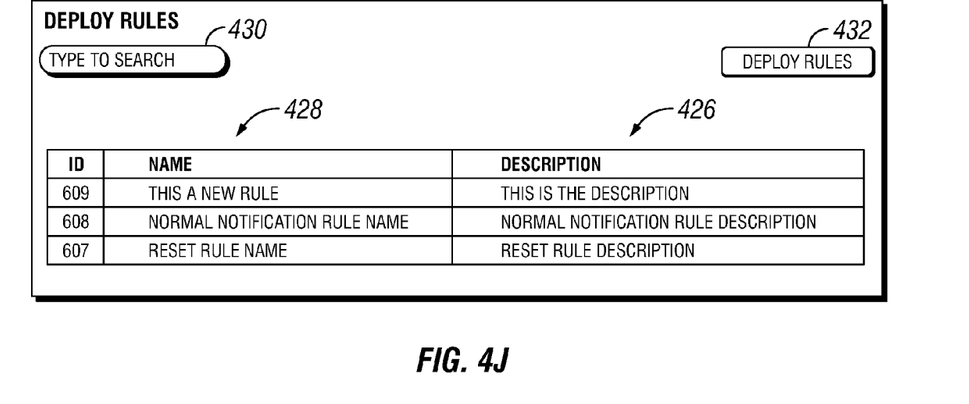
FIG. 4J illustrates a deploy rules screen when the "Deploy Rules" menu item is selected from the "Deployment" menu in FIG. 4I, according to exemplary embodiments.

After the rules have been created and approved, the rules may be deployed or transmitted to the aircraft. The transmitted rules may be stored on the air module 104 on board the aircraft. As illustrated in the exemplary embodiment of FIG. 4I, a menu "Deployment" may be displayed in the menu bar 302 when a user of the type "ADMIN" logs in the ground module 102. When the user selects the menu "Deployment," a drop down menu including the menu item 424 "Deploy Rules" may be displayed. FIG. 4J illustrates a deploy rules screen 426 that is displayed on the GUI 400 when the "Deploy Rules" menu item 424 is selected from the "Deployment" menu in FIG. 4I, according to exemplary embodiments. The deploy rules screen 426 may display a list 428 of approved rules, a search field 430, and a "Deploy Rules" button 432. The list 428 may show the rules that may be deployed to the aircraft. When the user selects one or more rules from the list 428, the selected rule(s) may be highlighted (not shown). The user may then select the "Deploy Rules" button 432 and a rules file may be created based on the highlighted rule(s). A message (not shown) may indicate to the user the name and location of the created rules file. According to an exemplary embodiment, the rules file may be transmitted (via a wired connection, wirelessly, or in any desired manner) to the aircraft and may be stored on the one or more EFBs or any information management device on board the aircraft specified in the rule(s) (See, FIG. 4A).

According to exemplary embodiments, the air module 104 may include the one or more EFBs on which the created rules file may be stored. During flight, the air module 104 may run on the selected EFB(s). The air module 104 may request aircraft data from the Aircraft Data Management Service (ADMS) at the frequency specified in the rule. The ADMS is a database on board the aircraft for all the aircraft data generated by one or more aircraft systems during any and all stages of aircraft operation (e.g. passenger pickup/drop off, cargo pickup/drop off, aircraft maintenance, landing, takeoff, taxi, cruise, and the like). Example aircraft data may include data generated by the different applications running on the aircraft, the data from the aircraft avionics, the data generated due to actions (e.g., yoke deflection and rudder pedal deflection, opening/closing of cabin door) by the aircraft crew members, or the data indicating the external atmospheric pressure and temperature.

The air module 104 may then compare the received aircraft data with the one or more conditions defined in the rule. In other words, the received aircraft data may be compared with the key word values specified in the rule. When a match is found, a notification including the notification message and the action to be performed, may be displayed on the corresponding EFB(s). For example, when a location defined by Longitude: 123.578 and Latitude: −45.567 is found to be at a distance less than or equal to 2000 nautical miles from the current position of the aircraft, a notification may be issued including a notification message that may state that the aircraft is approaching a restricted airspace. The notification may include an action to be performed by one or more aircraft crew members (e.g., pilot, co-pilot, cabin crew) in response to the notification. For example, an action may include diverting the aircraft to avoid the airspace around the location or landing the aircraft.

In an exemplary embodiment, the air module 104 may be configured to perform other tasks in addition to issuing notifications. For instance, the air module 104 may monitor (at a specified frequency) available disk storage space on an aircraft system, and when available space is less than a set value (e.g., specified by a key word), the air module 104 may delete data from the disk to create more disk space.

Figure 5:
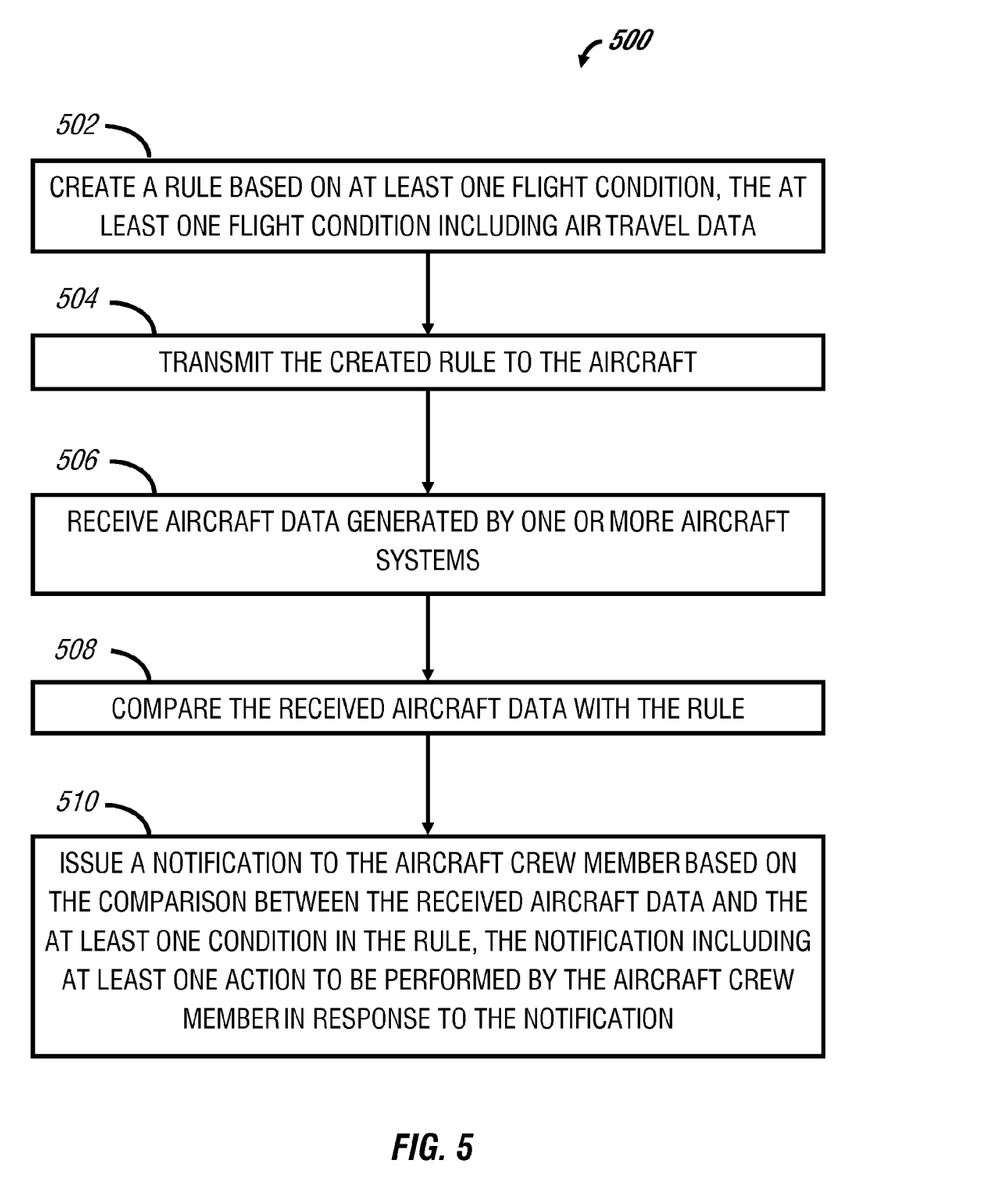
FIG. 5 illustrates a flowchart of a method of notifying an aircraft crew member using a notification management system, according to exemplary embodiments.

FIG. 5 illustrates a flowchart of a method 500 of notifying an aircraft crew member using a notification management system, according to exemplary embodiments. The method 500 may include creating a rule based on at least one flight condition, as at 502, and transmitting the created rule to the aircraft, as at 504. The at least one flight condition may include air travel data. The method 500 may further include receiving aircraft data generated by one or more aircraft systems, as at 506, comparing the received aircraft data with the rule, as at 508, and issuing a notification to the aircraft crew member based on the comparison between the received aircraft data and the at least one condition in the rule, as at 510. The notification may include at least one action to be performed by the aircraft crew member in response to the notification.

Example embodiments may also be directed to a computer-program product for notifying an aircraft crew member. The computer-program product may include one or more instructions stored on a non-transitory computer-readable storage medium and executable by one or more processors. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, when the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A method for controlling an aircraft during flight using a notification management system, the method comprising:
    creating a rule based on aircraft position information, a comparison operator, and a selected value associated with the aircraft position information;
    assigning a priority value to a notification associated with the rule, the priority value being assigned in relation to another priority value assigned to an application executable on an information management device onboard the aircraft;
    displaying on a display device the created rule, the aircraft position information, the comparison operator, the selected value associated with the aircraft position information, the priority value assigned to the notification, and at least one action to be performed in response to the notification;
    transmitting the created rule to the information management device onboard the aircraft;
    requesting aircraft data generated by one or more aircraft systems, the aircraft data including a current position of the aircraft;
    receiving the aircraft data onboard the aircraft;
    comparing, by a processor, via the comparison operator the current position of the aircraft with the aircraft position information and the selected value associated with the aircraft position information;
    issuing, by the processor, the notification to an aircraft crew member onboard the aircraft during flight based on the priority value assigned to the notification and the comparison of the current position of the aircraft with the aircraft position information and the selected value associated with the aircraft position information, the notification including the at least one action to be performed by the aircraft crew member in response to the notification; and
    controlling the aircraft to alter the current position of the aircraft based on the at least one action being performed by the aircraft crew member.

2. The method of claim 1, wherein the notification management system comprises:
    a ground module including the display device; and
    an air module including the information management device,
    wherein the ground module creates and transmits the rule, and
    wherein the air module receives the aircraft data from the one or more aircraft systems, compares the current position of the aircraft with the aircraft position information and the selected value associated with the aircraft position information, and issues the notification based on the priority value assigned to the notification.

3. The method of claim 1, wherein creating the rule comprises:

specifying, in the created rule, a notification message that is displayed on the information management device when issuing the notification to the aircraft crew member; and specifying, in the created rule, the at least one action to be performed by the aircraft crew member in response to the notification.

4. The method of claim 1, wherein creating the rule comprises:

specifying, in the created rule, a value indicating a number of times in a predetermined time period that the notification management system is permitted to request the aircraft data generated by the one or more aircraft systems.

5. The method of claim 4, wherein the received aircraft data is stored in a database on board the aircraft, and the notification management system is configured to request the aircraft data from the database.

6. The method of claim 1, wherein creating the rule comprises:

specifying, in the created rule, a value indicating a maximum number of times the notification management system is configured to issue the notification to the aircraft crew member per flight.

7. The method of claim 1, wherein creating the rule includes specifying, in the created rule, the information management device on board the aircraft on which the created rule is transmitted, and the method further comprises:

creating a rule file and transmitting the rule file for storing the rule file on the information management device specified in the rule.

* * * * *